US010961087B2

(12) United States Patent
Hangoebl

(10) Patent No.: US 10,961,087 B2
(45) Date of Patent: Mar. 30, 2021

(54) ARRANGEMENT OF A CONTROLLER AND A MOBILE CONTROL MODULE

(71) Applicant: Palfinger AG, Bergheim (AT)

(72) Inventor: Michael Hangoebl, Geretsberg (AT)

(73) Assignee: PALFINGER AG, Bergheim Bei Salzburg (AT)

( * ) Notice: Subject to any disclaimer, the term of this patent is extended or adjusted under 35 U.S.C. 154(b) by 0 days.

(21) Appl. No.: 15/951,230

(22) Filed: Apr. 12, 2018

(65) Prior Publication Data

US 2018/0229979 A1 Aug. 16, 2018

Related U.S. Application Data

(63) Continuation of application No. PCT/AT2016/060077, filed on Oct. 14, 2016.

(30) Foreign Application Priority Data

Oct. 16, 2015 (AT) .............................. GM 303/2015

(51) Int. Cl.
*B66C 13/42* (2006.01)
*B66C 15/00* (2006.01)
(Continued)

(52) U.S. Cl.
CPC .............. *B66C 13/42* (2013.01); *B66C 13/40* (2013.01); *B66C 13/44* (2013.01); *B66C 15/00* (2013.01);
(Continued)

(58) Field of Classification Search
CPC ......... B66C 13/42; B66C 13/40; B66C 13/44; B66C 15/065; B66C 23/705; B66C 2700/0392; B60C 15/00
See application file for complete search history.

(56) References Cited

U.S. PATENT DOCUMENTS 5,730,305 A * 3/1998 Ichiba ................... B66C 23/905 212/276
5,823,370 A * 10/1998 Ueda ..................... B66C 23/905 212/276
(Continued)

FOREIGN PATENT DOCUMENTS

AT 14237 6/2015
CN 201240780 5/2009
(Continued)

OTHER PUBLICATIONS

International Search Report dated Jan. 26, 2017 in International (PCT) Application No. PCT/AT2016/060077.
(Continued)

*Primary Examiner* — Sze-Hon Kong
(74) *Attorney, Agent, or Firm* — Wenderoth, Lind & Ponack, L.L.P.

(57) ABSTRACT

An arrangement of a control system and a mobile control module, via which the control system can be remote-controlled. The control system can be supplied with sensor data via signal inputs, and a processing unit of the control system can calculate from the sensor data and from stored lifting device-specific data information characteristic for the current lifting load situation the allowability of work processes on the lifting device, and optionally in the given current lifting load situation. The control system can transmit the information characteristic for the current lifting load situation and/or the allowability of work processes on the lifting device to the mobile control module via a transmitting and receiving module, to the mobile control module in a wireless and/or cable-bound manner. From the information, a processing unit of the mobile control module calculates graphic data for a display via a display unit.

18 Claims, 5 Drawing Sheets

(51) Int. Cl.

| | |
|---|---|
| ***B66C 13/40*** | (2006.01) |
| ***B66C 13/44*** | (2006.01) |
| ***B66C 15/06*** | (2006.01) |
| *B66C 23/70* | (2006.01) |

(52) U.S. Cl.

CPC .......... *B66C 15/065* (2013.01); *B66C 23/705* (2013.01); *B66C 2700/0392* (2013.01)

(56) References Cited

U.S. PATENT DOCUMENTS

| | | | | |
|---|---|---|---|---|
| 6,744,372 | B1 * | 6/2004 | Shaw | B66C 13/44 212/276 |
| 7,665,620 | B2 | 2/2010 | Morath | |
| 7,672,768 | B2 * | 3/2010 | Narisawa | B66C 23/905 340/438 |
| 8,392,075 | B2 * | 3/2013 | Mindeman | E02F 9/26 701/50 |
| 9,082,288 | B2 | 7/2015 | Wei et al. | |
| 9,446,935 | B2 * | 9/2016 | Ruoss | B66C 23/905 |
| 10,144,621 | B2 | 12/2018 | Braun et al. | |
| 10,207,904 | B2 * | 2/2019 | Morath | B66C 23/905 |
| 2004/0221673 | A1 * | 11/2004 | Mojzis | B66C 23/344 74/469 |
| 2005/0098520 | A1 * | 5/2005 | Frankenberger | B66C 23/74 212/276 |
| 2007/0156280 | A1 | 7/2007 | Morath | |
| 2007/0235404 | A1 * | 10/2007 | Catanzaro | B66C 13/44 212/312 |
| 2008/0004898 | A1 * | 1/2008 | Hubler | B66C 23/905 703/7 |
| 2008/0154395 | A1 | 6/2008 | Henriksson et al. | |
| 2009/0098914 | A1 * | 4/2009 | Martin-Cocher | H04W 52/0261 455/572 |
| 2010/0332876 | A1 * | 12/2010 | Fields, Jr. | G06F 1/3203 713/323 |
| 2011/0276261 | A1 * | 11/2011 | Mizutani | B66C 13/18 701/123 |
| 2012/0101694 | A1 * | 4/2012 | Morath | B66C 23/905 701/50 |
| 2012/0131364 | A1 * | 5/2012 | Gromat | H04W 52/0261 713/320 |
| 2013/0138229 | A1 | 5/2013 | Mizuura et al. | |
| 2013/0154869 | A1 * | 6/2013 | Cameron | G01S 13/46 342/54 |
| 2014/0015685 | A1 | 1/2014 | Wei et al. | |
| 2014/0077964 | A1 * | 3/2014 | Beligere | E21B 47/00 340/853.3 |
| 2014/0258908 | A1 * | 9/2014 | Miyoshi | G06F 3/0484 715/771 |
| 2014/0376384 | A1 * | 12/2014 | Bandyopadhyay | H04W 24/02 370/241 |
| 2015/0284231 | A1 * | 10/2015 | Grant | B66F 17/006 182/19 |
| 2015/0316921 | A1 * | 11/2015 | Atherton | G05B 19/4065 700/114 |
| 2016/0311664 | A1 | 10/2016 | Härkönen et al. | |
| 2017/0008739 | A1 * | 1/2017 | Nguyen | B66C 1/105 |
| 2017/0017392 | A1 * | 1/2017 | Castaneda | B60K 35/00 |
| 2017/0029252 | A1 | 2/2017 | Deimer | |
| 2017/0036894 | A1 * | 2/2017 | Braun | B66C 13/16 |
| 2018/0282131 | A1 * | 10/2018 | Hayashi | B66C 13/40 |

FOREIGN PATENT DOCUMENTS

| | | |
|---|---|---|
| CN | 201667015 | 12/2010 |
| CN | 104627840 | 5/2015 |
| DE | 20 2005 020 462 | 5/2007 |
| DE | 20 2010 014 309 | 3/2012 |
| EP | 0 614 845 | 5/2004 |
| EP | 2 489 625 | 2/2014 |
| EP | 2 806 324 | 11/2014 |
| EP | 1 490 288 | 2/2015 |
| EP | 3 134 344 | 9/2018 |
| JP | 03-073795 | 3/1991 |
| JP | 08-127490 | 5/1996 |
| JP | 11-278789 | 10/1999 |
| JP | 2000-63078 | 2/2000 |
| JP | 3245283 | 10/2001 |
| JP | 2013-523558 | 6/2013 |
| JP | 2014-174020 | 9/2014 |
| JP | 2014-234260 | 12/2014 |
| KR | 10-2014-0122699 | 10/2014 |
| WO | 2012/023309 | 2/2012 |
| WO | 2014/135169 | 9/2014 |
| WO | 2015/086912 | 6/2015 |
| WO | 2015/145725 | 10/2015 |

OTHER PUBLICATIONS

Search Report dated Oct. 12, 2016 in Austrian Application No. GM 303/2015, with English translation.

"The LICCON-Computersystem for Telescope- and Lattice boom cranes", Liebherr-werk Ehingen GmbH, Dec. 1997, downloaded at <http://www.liebherr-datasheets.dk/other/TP244a.D12.97.pdf> (cited in Austrian Search Report).

"Mobile Crane", Liebherr-Werk Enhingen GmbH, Mar. 2013, downloaded at <http://www.liebherr.com/external/products/products-assests/172916/liebherr-product-advantage-mobile-crane-211-ltm-1220-5-2-pn-211-00-e02-2014.pdf>.

Thesaurus: incremental print-out from www.merriam-webster.com.

Uthayakumar et al., "A survey on data compression techniques: From the perspective of data quality, coding schemes, data type and applications," Journal of King Saud University—Computer and Information Sciences, 2018.

"Mobile Cranes," p. 1213 of Springer Handbook of Mechanical Engineering, 2009.

* cited by examiner

ARRANGEMENT OF A CONTROLLER AND A MOBILE CONTROL MODULE

BACKGROUND OF THE INVENTION

The present invention relates to load lifting control arrangement consisting of a controller to be arranged on a hydraulic lifting device and a mobile control module, and a hydraulic lifting device with such a load lifting control arrangement.

The calculation of the current lifting load situation is effected with reference to the current geometry of the lifting device and to the supporting state of the lifting device in the stationary controller. From the thus-calculated data, information is determined which is characteristic of the current lifting load situation and/or the allowability of work processes on the lifting device in the given current lifting load situation. This information is transmitted to the mobile control module wirelessly or via cables.

The quantity of data to be transmitted under basic operation of the real-time requirement, i.e. a data transfer without time delay, is problematic. If the delay is too great, the result can be that the situation displayed on the mobile control module differs from the actually existing situation on the lifting device. For example, a movement on the mobile control module can still be displayed as allowed although the controller of the lifting device already prohibits this movement.

As remote operation of the controller through the mobile control module is a security-relevant process, it is not possible to use any arbitrary electronic hardware in the mobile control module.

SUMMARY OF THE INVENTION

The object of the invention is to provide a load lifting control arrangement consisting of a controller and a mobile control module, wherein the mobile control module, while guaranteeing real-time operation, does not require a processing power that is so great that the life of the mobile control module's battery would be appreciably restricted, and a hydraulic lifting device with such an arrangement.

The object is achieved according to the invention in that the controller can transmit to the mobile control module, via a transmitting and receiving module, the information which is characteristic of the current lifting load situation and/or the allowability of work processes on the lifting device—optionally in the given current lifting load situation—wirelessly and/or via cables to a transmitting and receiving module of the mobile control module. Furthermore, a processor of the mobile control module calculates from this information graph data for a display which can be displayed to a user via a display unit.

A mobile controller or a mobile control module can be an independent (optionally portable) operating unit, with which a user can move substantially freely within a certain area surrounding a crane or a hydraulic lifting device. Of course, data or information can be exchanged between such a mobile control module and the crane or the hydraulic lifting device (specifically with the controller thereof).

By preparation and interpretation of the sensor data in the stationary controller arranged or to be arranged on the hydraulic lifting device, use can be made of processors with high computing power, without their electrical power consumption apparently having to be taken into account.

The sensor data can originate, for example, from pressure sensors, rotary encoders, strain gauges, distance measurement devices or switches which are arranged in each case on parts of the lifting device, such as for instance hydraulic cylinders, pivot or articulated joints, frame parts or extension arms.

The information characteristic of the capacity utilization of the lifting device, which can include, for example, the current supporting situation, capacity utilization, geometry or also equipment of the lifting device, can be transmitted to the mobile control module in an operating mode of the controller suitable therefor. Starting from this transmitted information, graph data for a display can be calculated by a suitable processor in the mobile control module. This calculation can comprise, for example, a scaling, a selection and/or compilation of symbols or graphs stored in the control module or an incorporation of calculated graph data into stored background graphs. It can thus be achieved that the display is effected substantially in real time. The display unit can have, for example, a liquid crystal display.

The display of the calculated graph data, which give an indication of the current lifting load situation and/or the allowability of work processes on the lifting device—optionally in the given current lifting load situation—can thus be made possible on the mobile control module in a manner that is easily comprehensible to a user.

A transmission of the information via cables can take place, for example, when a user is located within a certain radius around the controller arranged or to be arranged on a hydraulic lifting device. In the case of particularly security-relevant control processes, this can also be a requirement for the allowability of the control commands issued by the user via the mobile control module.

The lifting device can be a crane such as a loading crane that can be arranged on a vehicle, or also an aerial work platform.

Preferably, the mobile control module has activation facilities for activating the calculation and/or the display, which can be operated by a user. The calculation and/or the display can thereby be activated, for example by a user, at a desired point in time or for a desired period of time. In the remaining time, savings can be made on processing power required for the calculation and/or display—and associated energy expenditure. It is also conceivable that a setting of the mobile control module executed by a user effects the activation of the calculation and/or the display automatically when a particular value of the capacity utilization of a lifting device is approached with a controller according to the invention or when a lifting load limit is approached.

It has proved to be advantageous that the mobile control module has an energy storage, and the calculation and/or the display can only be effected in a minimum charge state (one of multiple charge states) of the energy storage. The mobile control module can thereby be prevented from becoming inoperative due to a further, accelerated discharge through the calculation and/or the display—and the increased energy requirement possibly associated therewith—for example in an already low charge state of the energy storage. In the case of an operation of the mobile control module via cables, a charging of the energy storage can also be effected.

The characteristic information can also be transmitted incrementally. The transmission can be effected in particular angle increments, for example, for a polar angle of a payload-bearing part, for example a crane arm, of a lifting device with a controller according to the invention. Thus, for example, the characteristic information in each case contains a value for a lifting load or capacity utilization limit per 5° of 360°. When a particular value of the capacity utilization of a lifting device is approached, or when a lifting load limit is approached, the characteristic information can contain, for example, in each case a value for a lifting load or capacity utilization limit per 1° of 360°, so that a transmission can be effected in smaller increments in certain situations. Alternatively or additionally, it is conceivable that the incremental transmission of the characteristic information for the current lifting load situation in each case contains only the changes from the previous lifting load situation, whereby the quantity of data to be transmitted can be reduced.

Furthermore, the controller has another mode, in which it transmits the characteristic information depending on the rate of change of the sensor data. It can thereby be ensured that the information processed in the mobile control module and also the displayed graph data correspond to the current state of the lifting device. A change in sensor data of the lifting device can trigger, for example, a transmission of the characteristic information to the mobile control module. In the absence of changes in sensor data of the lifting device, for example, a transmission of the characteristic information to the mobile control module can be suspended.

Further, when the change in sensor data is slow, the transmission of the characteristic information can be effected with a reduced data rate. For example, in the event of a slow movement of a payload-bearing part of the lifting device, a transmission of the characteristic information can be effected less often per second. In the event of a faster change in the lifting load situation of the lifting device, a transmission of the characteristic information can be effected with an increased data rate. Thus, a display of the characteristic information being effected substantially in real time can be effected with an optimized data-transmission rate.

Furthermore, before the transmission of the characteristic information, a data compression can be effected in the controller. The required transmission duration of the characteristic information can thereby be advantageously minimized.

The transmission of the characteristic information is effected in the event of a change—preferably only in the event of a change—in the supporting situation of the lifting device and/or the location of the center of gravity of the lifting device. A change in the center of gravity can be effected, for example, by a change in the extension or position of an outrigger of the lifting device or also by a change in location of a part of the lifting device, for example an extended winch cable with a certain dead weight. The supporting situation can change, for example, due to a change of a support device of the lifting device supporting itself on the ground, such as for instance telescopic support legs. Through a transmission of the characteristic information in the event of a change in the supporting situation of the lifting device and/or the location of the center of gravity of the lifting device, the graph data displayed on the mobile control module can always correspond to the actual lifting load situation of the hydraulic lifting device. If the transmission is only effected in the event of a change in the supporting situation of the lifting device and/or the location of the center of gravity of the lifting device, the electrical power consumption of the controller or of the mobile control module can be optimized.

Furthermore, the change in the supporting situation of the lifting device and/or the location of the center of gravity can be effected through a change in the size or position of a payload raised by the lifting device and/or through a change in the size or position of a ballast weight that can be arranged on the lifting device. A change in the supporting situation and/or the location of the center of gravity can also comprise the accommodation or removal of a load on or from, for example, a loading area or a loading space of the lifting device with a controller according to the invention or a vehicle on which such a lifting device is arranged. A more uniform loading of the lifting device and an optimized utilization of the lifting potential can thereby advantageously result. A more efficient utilization and loading of the lifting device can likewise be effected through a change in the extension, position, or size of a ballast weight that can be arranged on the lifting device.

The display can comprise a display of the present capacity utilization of the lifting device in a Cartesian coordinate system or a polar coordinate system. Such a display provides a user with an easily and intuitively comprehensible appraisal of the current lifting load situation of the lifting device.

It can be advantageous if the display comprises an indication of the present capacity utilization of the lifting device in the form of a point, a line or another geometric shape in a coordinate system, wherein the point, the line or the other geometric shape has a coloring or greyscale corresponding to the present capacity utilization of the lifting device. The display can indicate the absolutely possible reach of a load raised by, for example, an arm of the lifting device before a certain capacity utilization limit is reached. This can be effected, for example, in the form of a point or any other desired graph symbol in a Cartesian coordinate system, in which a rotatable pillar of the lifting device lies at the origin of the coordinate system. The display of the present capacity utilization in the form of a line lends itself, for example, in the case of a display in polar coordinates in which the length of the line or the radius can correspond to the present absolute extension or also the present relative, for example percentage, to capacity utilization. The polar angle can represent the angular position of a payload-bearing arm in relation to a predefined axis, in the case of a vehicle crane, for example, the longitudinal axis of the vehicle. For improved visual checking, the point, the line, or the other geometric shape can additionally be provided colored, for example according to the coloring of a traffic light system, or with a greyscale in accordance with the present capacity utilization of the lifting device.

It can be advantageous if the display comprises information on the present overload value and/or cut-off value for the lifting device, preferably in the form of a polygonal chain. The information on the present overload value and/or cut-off value can reflect, for example, a maximum possible, absolute reach with respect to the stability or capacity utilization. It is also conceivable that the information on the present overload and/or cut-off value gives an indication of the increase in the capacity utilization in one direction. The display can be effected in a coordinate system by a polygonal chain which can, for example, be obtained by an interpolation between support points with calculated limit values, whereby the present lifting load situation can be represented and estimated particularly well.

The wireless transmission of the characteristic information used for the display can be effected via its own parallel second (dedicated) transmission channel. The transmission of control commands and the transmission of the characteristic information can thereby be effected separately from each other. Thus, it is also possible to use different communications standards. It can thus be possible to use certified hardware with, for example, suitable encryption, spread spectrum or plausibility check for security-relevant control signals, while a simpler and possibly also faster connection, such as for example an ISM radio link, can be used for the transmission of the characteristic information.

It can be advantageous if the transmission channel is encrypted. An interception or influencing of the transmission of the characteristic information can thereby be prevented or impeded. The requirements for the encryption can differ from those of the transmission channel for the control commands.

Protection is also sought for a hydraulic lifting device, in particular a loading crane for a vehicle—particularly preferably an articulated arm crane—or aerial work platform, with an arrangement as previously described.

BRIEF DESCRIPTION OF THE DRAWINGS

Embodiments of the invention will be discussed below with reference to the figures, in which.

DETAILED DESCRIPTION OF THE INVENTION

Figure 1:
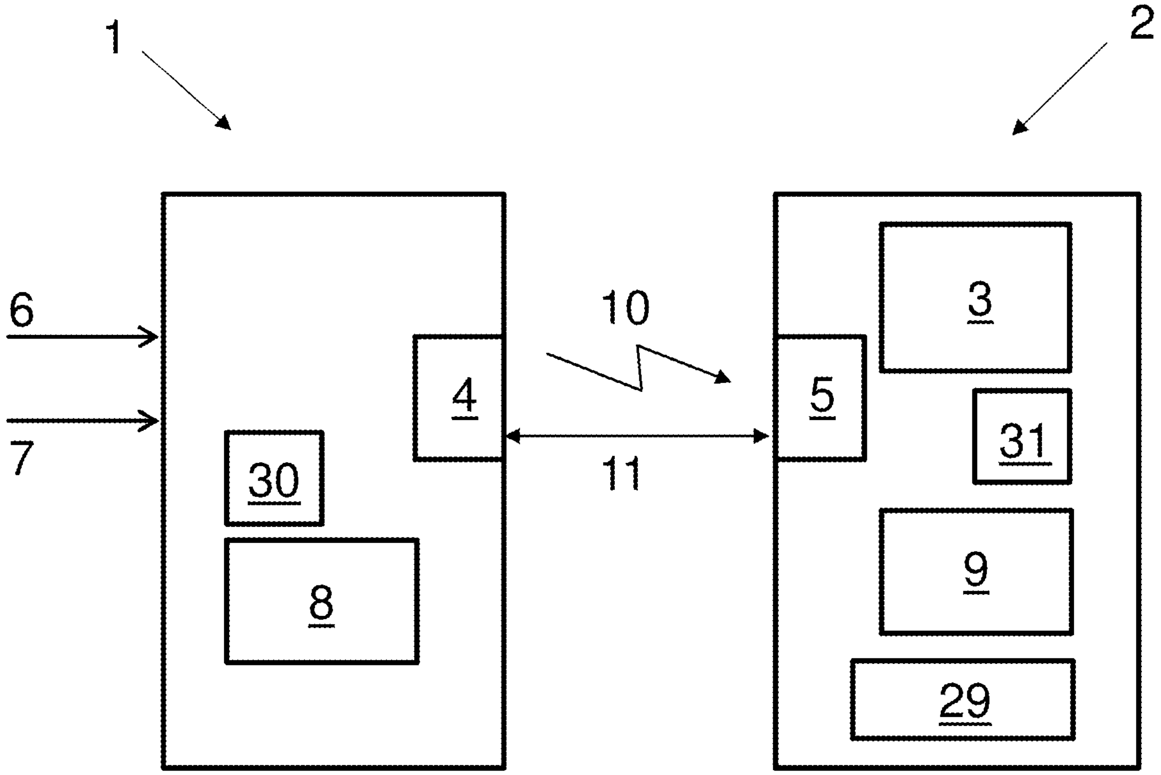
FIG. 1 is a schematic display of an embodiment of an arrangement according to the invention.

The crane controller 1 receives, via signal inputs 6, 7, sensor data with respect to the crane geometry, the supporting situation, and optionally the lifting load. In a crane controller processor 8, the crane controller 1 calculates, from the sensor data and from stored crane-specific data, characteristic information which is indicative of the current lifting load situation and/or the allowability of work processes on the crane—optionally, in the given current lifting load situation.

The controller 1 has a memory 30, in which data specific to the lifting device can be stored. These data can comprise information on equipment, functions and limit values of operating parameters of the lifting device. The calculation of the information which is characteristic of the current lifting load situation and/or the allowability of work processes on the lifting device—optionally in the given current lifting load situation—can be advantageously effected taking into account the data stored in the memory 30.

Via a transmitting and receiving module 4, the information which is characteristic of the current lifting load situation and/or the allowability of work processes on the crane—optionally, in the given current lifting load situation—is transmitted to a transmitting and receiving module 5 of the mobile control module 2 via a wireless connection 10 or a cable connection 11. A combination of a transmission with a wireless connection 10 and a cable connection 11 is also conceivable. The wireless connection 10 can transmit and receive data via several channels and in several frequency bands, even in parallel.

The mobile control module 2 has a memory 31, in which the transmitted information and also calculated graph data for a display can be stored.

For the supply of power, the mobile control module 2 has an energy storage 29, for example in the form of a rechargeable battery. The supply of power to the controller 1 can be effected via a power unit, not shown, of the lifting device.

Figure 2:
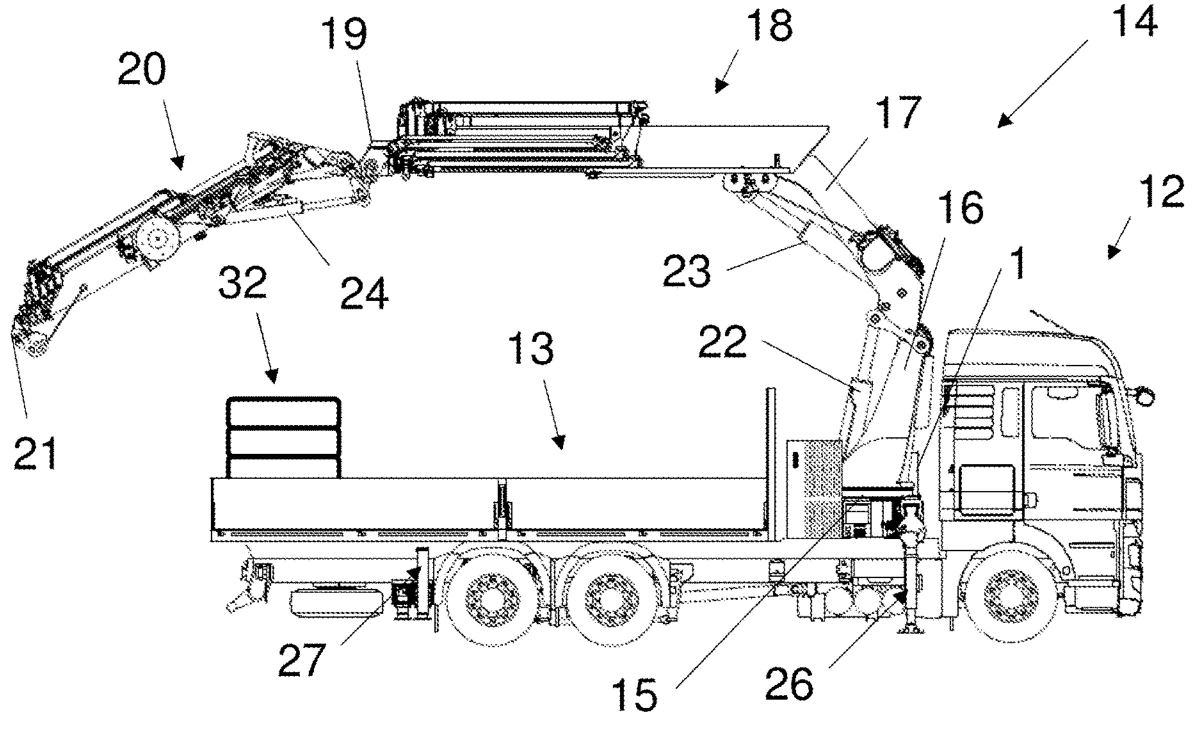
FIG. 2 shows an embodiment of a lifting device arranged on a vehicle.

FIG. 2 shows an embodiment of a lifting device arranged on a vehicle 12 and a controller 1 arranged thereon. The vehicle 12 has a loading area 13 for accommodating or also for transporting a payload or also a ballast weight 32. A lifting device in the form of a crane 14 is connected to the vehicle 12 via the crane base 15. A crane pillar 16 rotatable about a vertical axis is mounted on the crane base 15. A lifting arm 17 pivotable about a horizontal axis by a hydraulic cylinder 22 is arranged on the crane pillar 16. In turn, a crane arm extension 18 pivotable about a horizontal axis by a hydraulic cylinder 23 with at least one telescopic crane extension arm 19 is arranged on the lifting arm 17. As shown in the embodiment in FIG. 2, an attachment arm 20, which is also pivotable about a horizontal axis by a hydraulic cylinder 24, can be arranged on the crane arm extension 18. The attachment arm 20 can likewise have at least one telescopic crane extension arm 21. For additional support of the crane 14 or of the vehicle 12 bearing the lifting device, a support device in the form of an outrigger 26, 27, which can have extendible, telescopic support legs, is provided.

Figure 3:
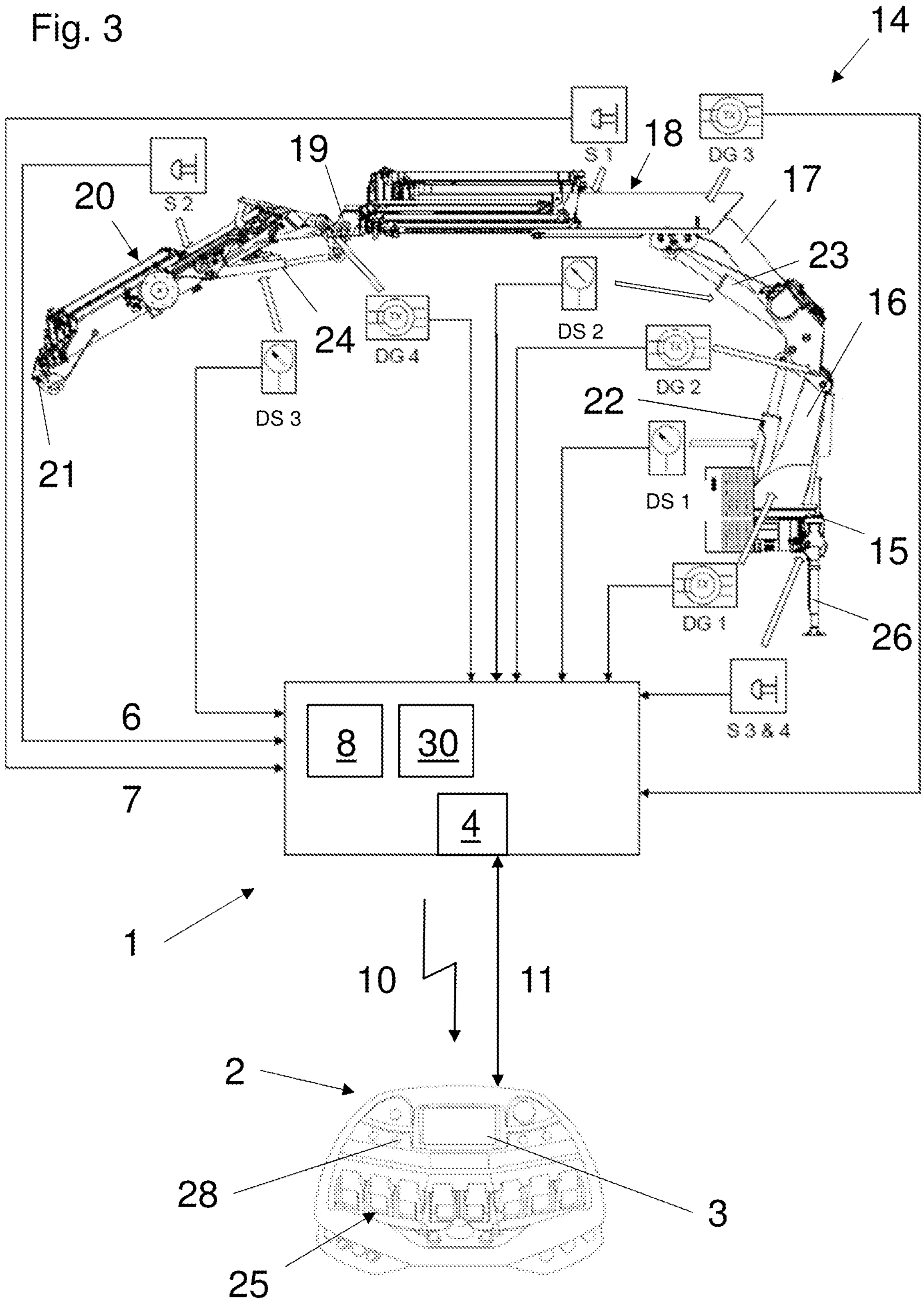
FIG. 3 is a schematic display of an embodiment of a lifting device and an arrangement according to the invention.

FIG. 3 shows a schematic display of an embodiment of a lifting device and an arrangement according to the invention consisting of a controller 1 and a mobile control module 2. In addition to the previously named components, the lifting device in the form of a crane 14 has various sensors for detecting the present positioning of the crane 14. For the outrigger 26, which can be formed on both sides of the crane base 15, switches S3, S4 are provided to detect the supporting state of the outrigger 26 on the ground. In a similar manner, such a sensor system can be provided for the outrigger 27, not shown here, which can be arranged on a frame part of the vehicle 12. It is also conceivable that the extending position of the outrigger 26, 27 is detected via a distance measurement device not shown here. A rotary encoder DG1 is provided to detect the angle of rotation of the crane pillar 16 in relation to the crane base 15. The angle of rotation of the crane pillar 16 detected by the rotary encoder DG1 about a vertical axis would correspond to the polar angle in a polar display. A further rotary encoder DG2 is provided to detect the articulation angle in a vertical plane between the crane pillar 16 and the lifting arm 17. The hydraulic pressure characteristic of the crane's capacity utilization in the hydraulic cylinder 22 of the lifting arm 17 is provided a pressure sensor DS1. A rotary encoder DG3 is provided to detect the articulation angle between the lifting arm 17 and the crane arm extension 18 in a vertical plane. A pressure sensor DS2 is provided to detect the hydraulic pressure in the hydraulic cylinder 23 of the crane arm extension 18. A switch S1 is provided to detect the retraction state of a crane extension arm 19 of the crane arm extension 18. A rotary encoder DG4 is further provided to detect the articulation angle between the crane arm extension 18 and the attachment arm 20 in a vertical plane. A pressure sensor DS3 is provided to detect the hydraulic pressure of the hydraulic cylinder 24 of the attachment arm 20. A switch S2 is provided to detect the retraction state of a crane extension arm 21 of the attachment arm 20. In principle, detecting the extension position of the individual crane extension arms via an extension position sensor with, for example, a distance measurement device is not to be ruled out.

The sensor data are fed to the controller 1 in each case via signal inputs, by which, by way of example, the signal inputs 6, 7 of the switches S1, S2 detecting the retraction position of the crane arm extension 18 and of the attachment arm 20 are designated. In the controller 1, from these sensor data and from data, in this example specific to the crane 14, stored in a memory 30, information is then calculated which is characteristic of the current lifting load situation and/or the allowability of work processes on the crane 14. Via a transmitting and receiving module 4 of the controller 1, this information can then be transmitted to a transmitting and receiving module 5 of a mobile control module 2 via a wireless connection 10 and/or a cable connection 11. From this information, graph data can be calculated by a processor 9 in the mobile control module 2 (see FIG. 2) for a display, and can be displayed to a user via a display unit 3. An activation of the display can optionally be effected via an activation facility 28 actuatable by a user, for example in the form of a switch or a button. Various operating elements 25 are provided on the mobile control module 2 for operating the mobile control module 2 and for inputting control commands.

Figure 4A:
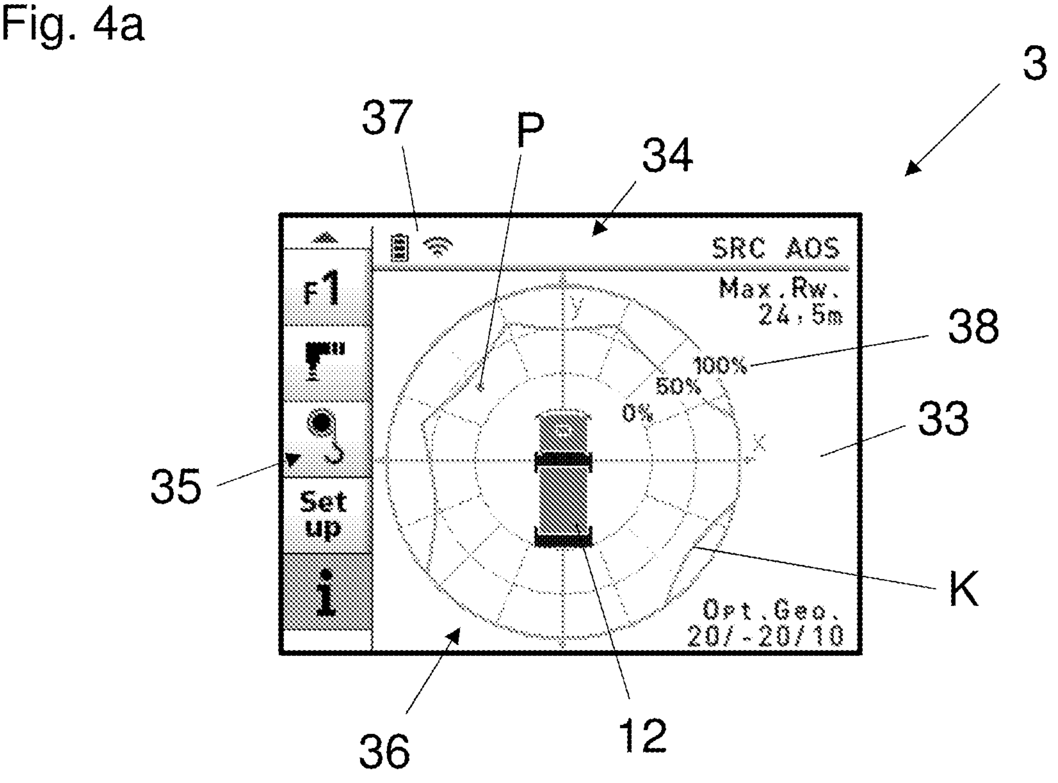
FIGS. 4*a*-4*c* are each a schematic representation of a display of graph data calculated from the characteristic information.

FIG. 4*a* shows a schematic display of graph data calculated from the transmitted information on a display unit 3. The display unit 3 can be formed, for example, of a graphics-capable liquid crystal display 33 which is or can be fixed in or on the mobile control module 2. In the embodiment shown, the display on the display unit 3 comprises a schematic display, embedded in a coordinate system 36, of a vehicle 12 as shown in FIG. 2 with a lifting device in top view. The rotatably mounted crane pillar 16 is advantageously placed at the origin of the coordinate system 36. The display can be effected, as shown, in a Cartesian coordinate system with coordinate axes denoted X and Y or also in a polar coordinate system. The present capacity utilization of the lifting device is displayed in the form of a point P plotted in the coordinate system 36. The polygonal chain K represents the nominally maximum allowable capacity utilization of the lifting device. As shown, the lifting device is currently located close to a maximum allowable capacity utilization, which is easily and intuitively recognizable for a user through the proximity of the point P to the capacity utilization limit represented by the polygonal chain K. The display on the display unit 3 can additionally comprise a menu bar 35, via which settings, information or alternative functions can be accessed, and a title bar 34 with for instance a status display 37, which can give an indication of the charge state of the energy storage 29 or also of the type and quality of the data connection. The coordinate lines can also have a legend 38 with information on the current scaling of the display.

Figure 4B:
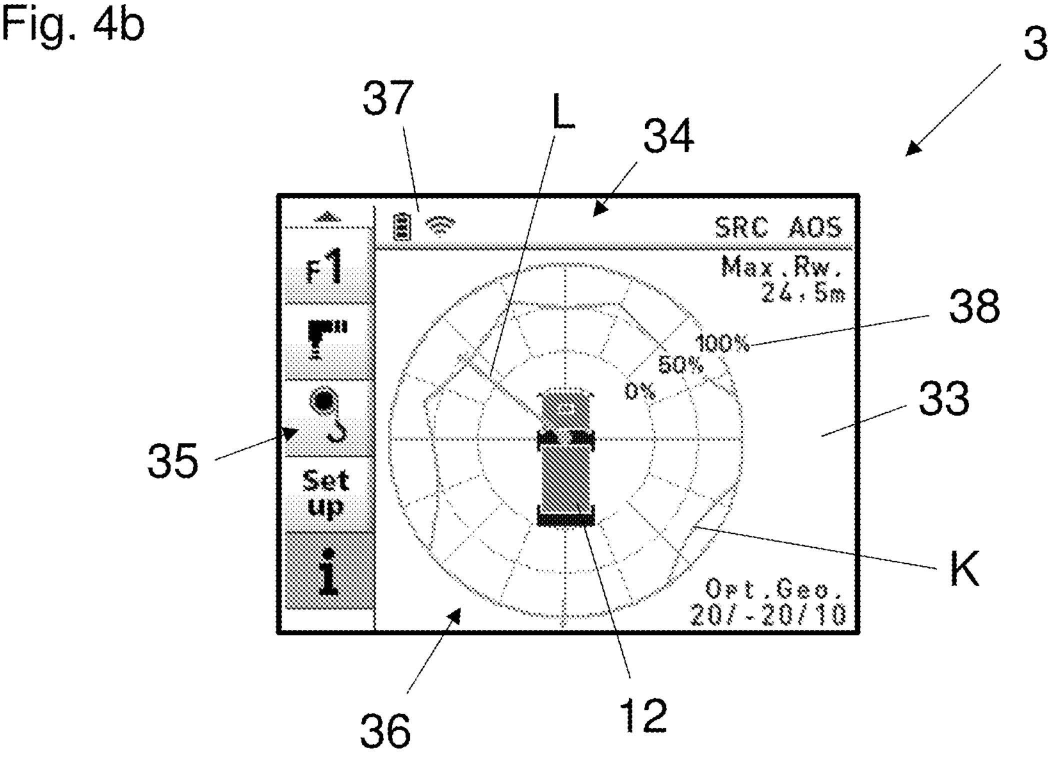

FIG. 4*b* shows a schematic display of graph data calculated from characteristic information and displayed via a display unit 3, wherein the present capacity utilization of the lifting device is indicated in the form of a line in a polar coordinate system. In the case of an arrangement shown, for example, in FIG. 3 with a crane 14, the polar angle of the line L corresponds substantially to the angle of rotation of the crane pillar 16 detected with the rotary encoder DG1 in relation to the crane base 15, and the vehicle 12 represented schematically in top view in FIG. 4*b* is oriented along its imaginary longitudinal axis in the coordinate system 36. The nominally allowable capacity utilization limit is drawn in with the polynomial chain K in the coordination system 36. The capacity utilization of the lifting device displayed in the form of the line L is represented by the length of the line L, and the capacity utilization of the lifting device, as shown, exceeds the nominally allowable capacity utilization limit. It is thus easily recognizable for a user that the lifting device is located within an inadmissible capacity utilization range.

Figure 4C:
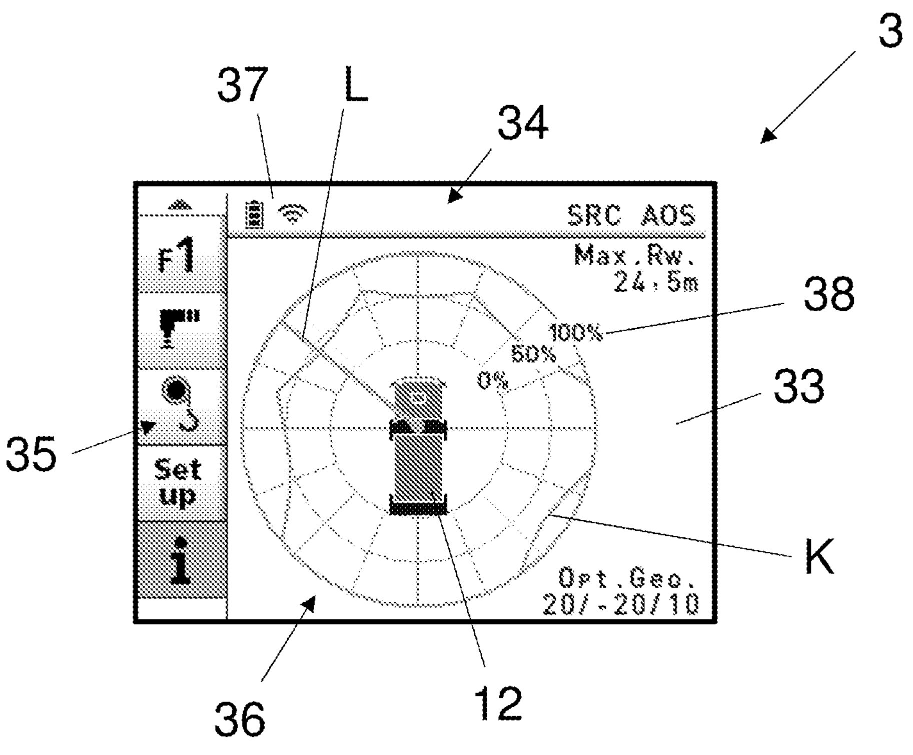

FIG. 4*c* shows a further embodiment of a graphic display of the capacity utilization of the lifting device. The display is again effected with a line L plotted in a coordinate system 36, wherein the polar angle of the line L again corresponds to the angle of rotation of the lifting device. The capacity utilization of the lifting device is shown by a greyscale corresponding to the present capacity utilization. A greater capacity utilization can be displayed with a darker greyscale. Alternatively, it is possible to display the capacity utilization with a corresponding coloring. For example, similarly to the coloring of a traffic light system, a small capacity utilization can be represented by a green line L, a medium capacity utilization by an amber line L and a large capacity utilization, for example, by a red line L.

LIST OF REFERENCE NUMBERS control 1
control module 2
display unit 3
transmitting and receiving module 4
transmitting and receiving module 5
signal input 6, 7
processor 8
processor 9
wireless connection 10
cable connection 11
vehicle 12
loading area 13
crane 14
crane base 15
crane pillar 16
lifting arm 17
crane arm extension 18
crane extension arm 19
attachment arm 20
crane extension arm 21
hydraulic cylinder 22, 23, 24
operating elements 25
outrigger 26, 27
activation facility 28
energy storage 29
memory 30
memory 31
ballast weight 32
liquid crystal display 33
title bar 34
menu bar 35
coordinate system 36
status display 37
legend 38
pressure sensor DS1, DS2
rotary encoder DG1, DG2, DG3, DG4
switch S1, S2, S3, S4
point P
line L
polygonal chain K

The invention claimed is:

1. A load lifting control arrangement comprising:

a controller to be arranged on a hydraulic lifting device, the controller including signal inputs, a controller processor, and a controller transmitting and receiving module; and a mobile control module configured to remote-control the controller, the mobile control module including a mobile control processor, a mobile control transmitting and receiving module, and a display unit;

wherein the controller is configured to receive sensor data via the signal inputs, and the controller processor is configured to calculate characteristic information from the sensor data and from stored data specific to the lifting device, the characteristic information indicating at least one of (i) a current lifting load situation and (ii) an allowability of work processes on the lifting device, wherein the controller transmitting and receiving module is configured to transmit to the mobile control transmitting and receiving module of the mobile control module the characteristic information wirelessly and/or via cables, wherein the mobile control processor of the mobile control module is configured to calculate graph data from the characteristic information, the graph data to be displayed to a user on the display unit, and wherein the controller transmitting and receiving module is configured to transmit the characteristic information depending on a rate of change of the sensor data.

2. The load lifting control arrangement according to claim 1, wherein the mobile control module further includes activation facilities for activating at least one of (i) the mobile control processor to calculate the graph data and (ii) the display unit, the activation facilities to be operated by a user.

3. The load lifting control arrangement according to claim 1, wherein the mobile control module further includes an energy storage having multiple charge states, and the mobile control processor and display unit are configured to operate in a minimum charge state of the energy storage.

4. The load lifting control arrangement according to claim 1, wherein the controller transmitting and receiving module is configured to transmit the characteristic information incrementally.

5. The load lifting control arrangement according to claim 1, wherein the controller transmitting and receiving module is configured to, when the rate of change of the sensor data is slow, transmit the characteristic information at a reduced data transmission rate.

6. The load lifting control arrangement according to claim 1, wherein the controller process is configured to, before transmission of the characteristic information, perform a data compression.

7. The load lifting control arrangement according to claim 1, wherein the display unit is configured to indicate a present capacity utilization of the lifting device in a Cartesian coordinate system or a polar coordinate system.

8. The load lifting control arrangement according to claim 1, wherein the display unit is configured to indicate a present capacity utilization of the lifting device as a point, a line, or another geometric shape in a coordinate system, wherein the point, the line, or the other geometric shape has a coloring or greyscale corresponding to the present capacity utilization of the lifting device.

9. The load lifting control arrangement according to claim 1, wherein the display unit is configured to indicate information on at least one of a present overload value and a cut-off value for the lifting device.

10. The load lifting control arrangement according to claim 9, wherein the display unit is configured to indicate information on at least one of a present overload value and a cut-off value for the lifting device in a form of a polygonal chain.

11. The load lifting control arrangement according to claim 1, wherein the controller transmitting and receiving module is configured to wirelessly transmit the characteristic information via a dedicated transmission channel.

12. The load lifting control arrangement according to claim 11, wherein the dedicated transmission channel is encrypted.

13. A hydraulic lifting device, in particular loading crane for a vehicle comprising the load lifting control arrangement according to claim 1.

14. The hydraulic lifting device according to claim 13, wherein the lifting device is one of an articulated loading arm crane for a vehicle or an aerial work platform.

15. The load lifting control arrangement according to claim 1, wherein the controller processor is configured to calculate the characteristic from the sensor data in a current lifting load situation.

16. The load lifting control arrangement according to claim 1, wherein the mobile control processor of the mobile control module is configured to calculate graph data from the characteristic information as at least one of scaling, a group of symbols or graphs to be stored in the mobile control module, or an incorporation of calculated graph data into stored background graphs.

17. A load lifting control arrangement comprising:

a controller to be arranged on a hydraulic lifting device, the controller including signal inputs, a controller processor, and a controller transmitting and receiving module; and a mobile control module configured to remote-control the controller, the mobile control module including a mobile control processor, a mobile control transmitting and receiving module, and a display unit;

wherein the controller is configured to receive sensor data via the signal inputs, and the controller processor is configured to calculate characteristic information from the sensor data and from stored data specific to the lifting device, the characteristic information indicating at least one of (i) a current lifting load situation and (ii) an allowability of work processes on the lifting device, wherein the controller transmitting and receiving module is configured to transmit to the mobile control transmitting and receiving module of the mobile control module the characteristic information wirelessly and/or via cables, wherein the mobile control processor of the mobile control module is configured to calculate graph data from the characteristic information, the graph data to be displayed to a user on the display unit, and wherein the controller transmitting and receiving module is configured to transmit the characteristic information only if a change occurs in at least one of (i) a supporting situation of the lifting device and (ii) a location of the center of gravity of the lifting device.

18. The load lifting control arrangement according to claim 17, wherein the change in at least one of (i) the supporting situation of the lifting device and (ii) the location of the center of gravity of the lifting device is effected through a change in at least one of (a) a size of a payload raised by the lifting device, (b) a position of the payload raised by the lifting device, (c) a size of a ballast weight arranged on the lifting device, and (d) a position of a ballast weight arranged on the lifting device.

* * * * *